US010628626B1

(12) United States Patent
Gangwar et al.

(10) Patent No.: US 10,628,626 B1
(45) Date of Patent: Apr. 21, 2020

(54) INTEGRATED CIRCUIT DESIGN

(71) Applicant: Arm Limited, Cambridge (GB)

(72) Inventors: Anup Gangwar, Bangalore (IN); Nitin Kumar Agarwal, Bangalore (IN); Honnahuggi Harinath Venkata Naga Ambica Prasad, Bangalore (IN)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/170,343

(22) Filed: Oct. 25, 2018

(51) Int. Cl.
*G06F 30/394* (2020.01)
*G06F 30/392* (2020.01)

(52) U.S. Cl.
CPC .......... *G06F 30/394* (2020.01); *G06F 30/392* (2020.01)

(58) Field of Classification Search
CPC .......................... G06F 17/5077; G06F 17/5072
(Continued)

(56) References Cited

U.S. PATENT DOCUMENTS

2008/0012736 A1* 1/2008 Goossens ............ H04L 12/4625
341/51
2016/0323127 A1* 11/2016 Pande ................. H04L 27/0002
(Continued)

OTHER PUBLICATIONS

U.S. Appl. No. 15/711,054, filed Sep. 21, 2017, Anup Gangwar et al.

Primary Examiner — Suresh Memula
(74) Attorney, Agent, or Firm — Nixon & Vanderhye P.C.

(57) ABSTRACT

A computer-implemented method of integrated circuit design comprises: using a computer, detecting data communication paths and associated data traffic requirements between a set of data handling nodes in an integrated circuit layout, the data handling nodes acting as routing nodes or either source nodes or sink nodes for a given data communication path, each source node and each sink node having a respective provisional data width, each data communication path having at least one routing node between the source node and the sink node; using the computer, assigning a provisional data width to each routing node so that, for each of the detected data communication paths, the one or more routing nodes in that data communication path have a provisional data width sufficient to handle the data traffic requirement associated with that communication path; using the computer, performing one or more iterations of modifying the integrated circuit topology by:
(i) detecting two or more connected groups of the data handling nodes in which all of the data handling nodes in a given group have the same provisional data width and in which, for each given group, the provisional data width of data handling nodes in that group is different to the provisional data width of data handling nodes in a group connected to the given group;
(ii) selecting two or more of the groups to be merged, in dependence upon a cost function; and
(iii) merging the selected two or more groups, the merging comprising assigning a provisional data width to all of the data handling nodes in the selected two or more groups equal to one of the provisional data widths amongst the selected two or more groups; and
using the computer, providing one or more other components in the layout including at least a data width resizing component between each pair of groups having different respective provisional data widths.

20 Claims, 15 Drawing Sheets

(58) Field of Classification Search
USPC .......................................................... 716/119
See application file for complete search history.

(56) References Cited

U.S. PATENT DOCUMENTS

2019/0087157 A1* 3/2019 Gangwar ................. G06F 7/509
2019/0196990 A1* 6/2019 Laughton ............ G06F 13/1678

* cited by examiner

INTEGRATED CIRCUIT DESIGN

BACKGROUND

This disclosure relates to integrated circuit design.

In the design of some integrated circuit topologies such as (for example) topologies for so-called network on chip (NoC) devices, multiple data handling nodes are connected together to form data communication paths.

The integrated circuit area needed to implement the topology can increase with the data width of the data communication paths, in that a greater data width implies a larger number of parallel connections to be implemented in the final integrated circuit. In the case of data communication paths between two data handling nodes associated with different data widths, there can be a need for data width resizing components to provide an interface between the two data widths.

SUMMARY

In an example arrangement there is provided a computer-implemented method of integrated circuit design, the method comprising:

using a computer, detecting data communication paths and associated data traffic requirements between a set of data handling nodes in an integrated circuit layout, the data handling nodes acting as routing nodes or either source nodes or sink nodes for a given data communication path, each source node and each sink node having a respective provisional data width, each data communication path having at least one routing node between the source node and the sink node;

using the computer, assigning a provisional data width to each routing node so that, for each of the detected data communication paths, the one or more routing nodes in that data communication path have a provisional data width sufficient to handle the data traffic requirement associated with that communication path;

using the computer, performing one or more iterations of modifying the integrated circuit topology by:
  (i) detecting two or more connected groups of the data handling nodes in which all of the data handling nodes in a given group have the same provisional data width and in which, for each given group, the provisional data width of data handling nodes in that group is different to the provisional data width of data handling nodes in a group connected to the given group;
  (ii) selecting two or more of the groups to be merged, in dependence upon a cost function; and
  (iii) merging the selected two or more groups, the merging comprising assigning a provisional data width to all of the data handling nodes in the selected two or more groups equal to one of the provisional data widths amongst the selected two or more groups; and using the computer, providing one or more other components in the layout including at least a data width resizing component between each pair of groups having different respective provisional data widths.

In another example arrangement there is provided an integrated circuit having an integrated circuit design produced by the method defined above.

In another example arrangement there is provided a computer program product comprising a non-transitory machine-readable storage medium on which are stored program instructions which, when executed by a computer processor, cause the computer processor to perform a method of integrated circuit design, the method comprising:

detecting data communication paths and associated data traffic requirements between a set of data handling nodes in an integrated circuit layout, the data handling nodes acting as routing nodes or either source nodes or sink nodes for a given data communication path, each source node and each sink node having a respective provisional data width, each data communication path having at least one routing node between the source node and the sink node;

assigning a provisional data width to each routing node so that, for each of the detected data communication paths, the one or more routing nodes in that data communication path have a provisional data width sufficient to handle the data traffic requirement associated with that communication path;

performing one or more iterations of modifying the integrated circuit topology by:
  (i) detecting two or more connected groups of the data handling nodes in which all of the data handling nodes in a given group have the same provisional data width and in which, for each given group, the provisional data width of data handling nodes in that group is different to the provisional data width of data handling nodes in a group connected to the given group;
  (ii) selecting two or more of the groups to be merged, in dependence upon a cost function; and
  (iii) merging the selected two or more groups, the merging comprising assigning a provisional data width to all of the data handling nodes in the selected two or more groups equal to one of the provisional data widths amongst the selected two or more groups; and providing one or more other components in the layout including at least a data width resizing component between each pair of groups having different respective provisional data widths.

Further respective aspects and features of the present technology are defined by the appended claims.

BRIEF DESCRIPTION OF THE DRAWINGS

The present technique will be described further, by way of example only, with reference to embodiments thereof as illustrated in the accompanying drawings, in which:

Example embodiments of the present disclosure relate to a method performed by a computer or data processing system such as a computer processor. FIG. 1 is a schematic diagram of an example computer apparatus appropriate to the performance of such a method.

Referring to FIG. 1, various components are shown schematically, interconnected by a bus arrangement 170. Other components may also be provided even if they are not shown (for clarity of the diagram and explanation) in FIG. 1.

The example computer 100 comprises: a central processing unit (CPU) 110, a random access memory (RAM) 120, a non-volatile memory (NVM) 130 such as a hard disk drive, an interface (I/F) 140 for connecting to other components such as peripheral devices, a network connection, the internet and so on, a user interface (UI) 150 providing, for example, a keyboard, mouse, display or the like, and a non-transitory machine readable medium (NTMRM) 160 such as a magnetic or optical disk, a flash memory or other non-volatile memory or the like.

In example arrangements, the NTMRM 160 can embody a computer program product comprising the NTMRM 160 on which are stored program instructions which, when executed by the computer processor 110 of the computer 100, cause the computer processor to perform a method of the type described below, such as the method of FIG. 3 to be discussed below.

Example arrangements relate to the design, by a computer system, of an integrated circuit device such as a so-called network on chip (NoC) device, although the design of other types of integrated circuit is also envisaged within the scope of the present disclosure.

An NoC represents a system of interconnected processing devices or other devices embodied on a single integrated circuit. An example schematic representation of an NoC 310, providing an example of an integrated circuit designed and/or fabricated according to the present techniques, is provided as FIG. 2. Here, multiple so-called IP blocks 300 are connected to one another to provide a network of such blocks. In this example, an "IP block" is a unit of circuitry with particular functionality, which typically (though not necessarily) represents the intellectual property or IP of a single party. Commonly, in integrated circuit design, these so-called IP blocks are treated as units within the integrated circuit design process, even though an IP block may comprise very many gates, transistors or other components in its own right. The term "IP block" is used here in a generic illustrative sense; the IP blocks 300 are simply functional blocks with the capability of communicating data with other such functional blocks. Their precise function is a matter of system design and is not relevant to the communication arrangements which will be discussed in more detail below. Similarly, although the term "IP block" implies ownership of rights in the module design, the present disclosure is not limited to any particular ownership arrangement.

Figure 2:
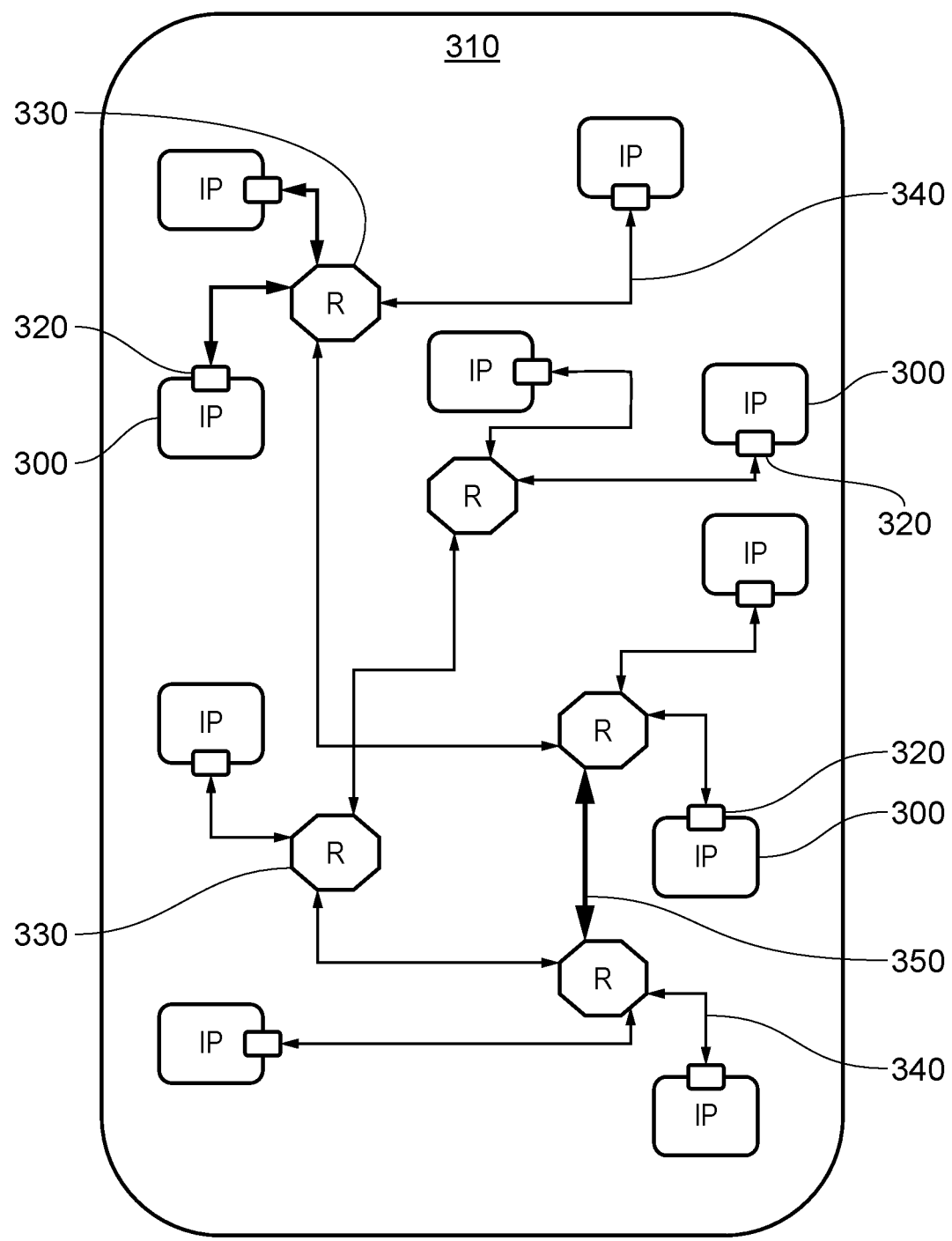
FIG. 2 schematically illustrates an NoC.

So, for the purposes of FIG. 2, it is sufficient to note that the IP blocks 300 are capable of communicating with other IP blocks 300 within the NoC 310.

Communication between IP blocks may be according to so-called virtual channels (VCs). Virtual channels assign a respective time slot (in a time division multiplexed arrangement) or (in other examples) an identifier to packets being transmitted via a physical connection between two data handling nodes, so as to allow multiple communication paths (such as paths in each direction) to use that physical connection in such a way that packets associated with different VCs do not collide or otherwise interfere with one another.

Each IP block comprises a bridge 320 shown as a shaded box at an input/output of the IP block. The purpose of the bridge is as follows. In general terms, within an NoC such as the schematic NoC 310, data is transferred in packetized form, for example as so-called flits (flow control units). The routing and transmission of the flits is under the control of various interconnected routers (R) 330. The data transport mechanism used by the routers 330 and connections such as connections 340 between the routers and the IP blocks is generic, which is to say the same protocol is used regardless of the nature of the IP blocks 300 forming the NoC 310. In other words, the transport protocol is "agnostic" to the nature or design of the individual IP blocks. The bridges 320 convert a particular IP block's data protocol (which may not be necessarily a packetized protocol) into the generic transport protocol used by the network connections 340 and the routers 330. Similarly, for packets or flits received from the network, the bridges 320 convert the generic transport protocol of the network into the specific data input requirements of the respective IP block.

So, a particular bridge is specific to its associated IP block in terms of its interface with that IP block, but it generic to the network in terms of its interface with the network.

The routers 330 in FIG. 2 are shown schematically as octagonal blocks, which schematically represents the fact they are 8-port routers. However, other numbers of router ports could be provided. The routers could all have a similar design, or different types of routers could be used within a single NoC.

As discussed below, the data links 340 have an associated data width in terms of the number of bits that can be transmitted in parallel. For example, this may correspond to a number of physical conductors in a finally implemented device.

An example data link 350 is drawn schematically using a wider or thicker line than other data links in the schematic representation of FIG. 2. This is to provide a schematic representation of a wider data link, which is to say that more conductors are provided so that the data link 350 can carry more data in parallel than other narrower data links of FIG. 2. This could represent a greater capacity of that data link in terms of bits per second transferred, if the data link 350 runs at the same clock speed as other, narrower, data links in FIG. 2. Alternatively, the clock speed of the data link 350 could be proportionately slower so that although more physical wires are used for the data link 350, its transport capacity in bits per second is the same as that of other data links such as the data links 340. In general, the data transport capacity of each of the data links is dependent upon by its width multiplied by its operating clock speed.

In the example of FIG. 2, between any one of the IP blocks 300 and any other one of the IP blocks 300, there is only one valid data transfer route. The routing is statically determined at the integrated circuit design stage. If the interconnection of routers 330 provides multiple potential data transport routes, a particular route between a first and a second IP block is selected and established statically in advance rather than being allocated dynamically in use. This provides a safer mode of operation avoiding potential deadlocks or other hazardous situations which might occur if the routing of data packets was selectable in operation. So, regardless of how many potential connections there are between a particular IP block pair of one IP block and another, the data will be routed by a pre-selected one of those connection routes.

Note that in FIG. 2, it is possible that the data handling nodes are configured within more than one power domain, in which case one or more of the other components provided (for example, in a step 230 of FIG. 3 to be discussed below)

may be a power converter component. Similarly, it is possible that the data handling nodes are configured within more than one clock domain, in which case one or more of the other components provided at 230 may be a clock domain converter component. In examples where a data communication path has, in the layout, at least a threshold path length, the routing nodes of that data communication path may comprise a pipeline component.

Figure 3:
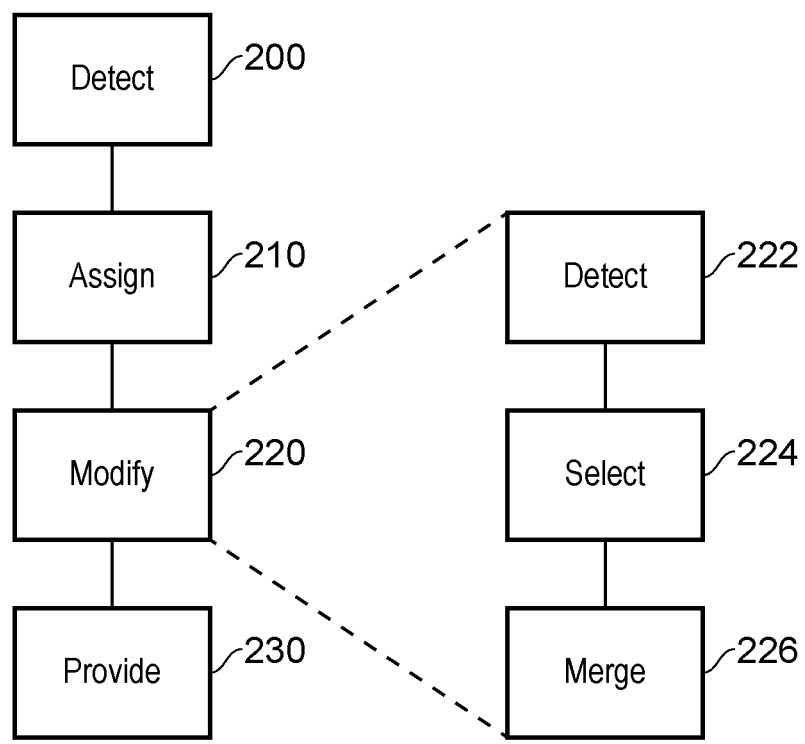
FIG. 3 is a schematic flowchart illustrating a method.

Referring now to FIG. 3, by way of summary of the processes to be discussed below, a schematic flowchart is provided representing a computer-implemented method of integrated circuit design, the method comprising:

at a step 200, using a computer, detecting data communication paths and associated data traffic requirements between a set of data handling nodes in an integrated circuit layout, the data handling nodes acting as routing nodes or either source nodes or sink nodes for a given data communication path, each source node and each sink node having a respective provisional data width, each data communication path having at least one routing node between the source node and the sink node;

at a step 210, using the computer, assigning a provisional data width to each routing node so that, for each of the detected data communication paths, the one or more routing nodes in that data communication path have a provisional data width sufficient to handle the data traffic requirement associated with that communication path;

at a step 220, using the computer, performing one or more iterations of modifying the integrated circuit topology by:

at a step 222, detecting two or more connected groups of the data handling nodes in which all of the data handling nodes in a given group have the same provisional data width and in which, for each given group, the provisional data width of data handling nodes in that group is different to the provisional data width of data handling nodes in a group connected to the given group;

at a step 224, selecting two or more of the groups to be merged, in dependence upon a cost function; and at a step 226, merging the selected two or more groups, the merging comprising assigning a provisional data width to all of the data handling nodes in the selected two or more groups equal to one of the provisional data widths amongst the selected two or more groups. In examples as discussed below, the merging step comprises merging the selected two or more groups, the merging comprising assigning a provisional data width to all of the data handling nodes in the selected two or more groups equal to the highest provisional data width amongst the selected two or more groups; and at a step 230, using the computer, providing one or more other components in the layout including at least a data width resizing component between each pair of groups having different respective provisional data widths.

Figure 1:
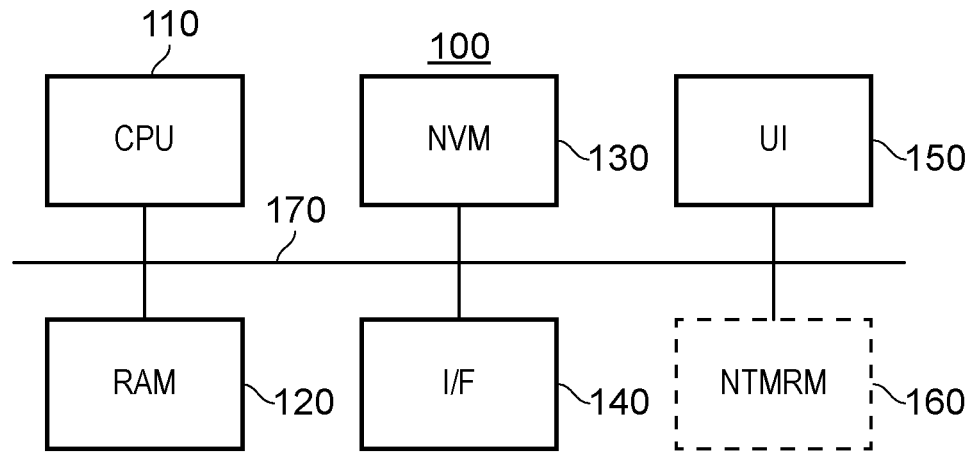
FIG. 1 schematically illustrates an example computer system.

The computer used to implement these steps may be the schematic apparatus of FIG. 1. The steps shown in FIG. 3 will be discussed in more detail below with reference to a worked example.

Figure 4:
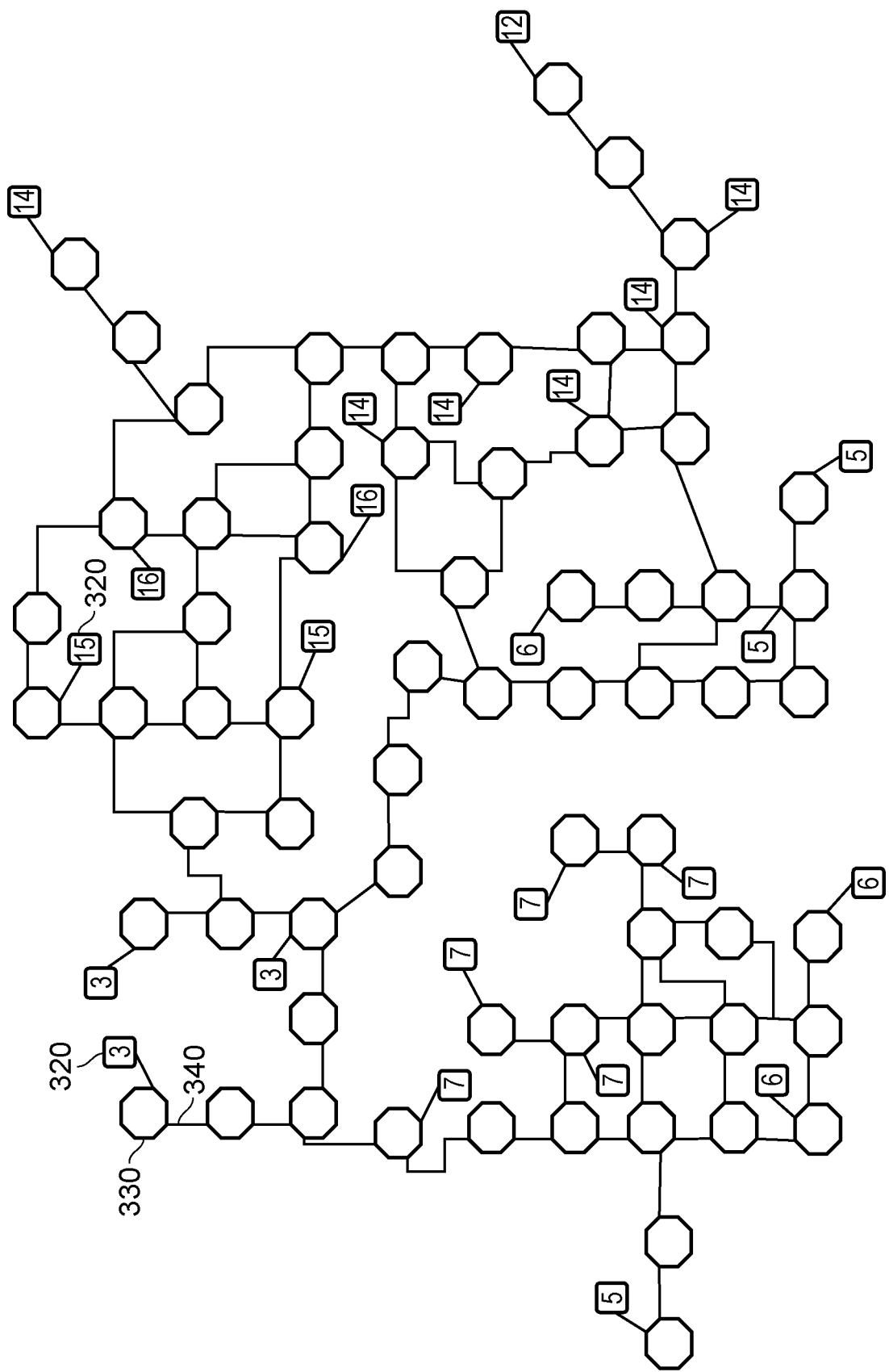
FIG. 4 to schematically illustrates a draft layout.

Referring now to FIG. 4, a draft layout of an integrated circuit is illustrated showing the data connections between routers 330 and bridges 320 of the form described with reference to FIG. 2. The data links or connections 340 required to achieve the functionality of the circuitry are also illustrated, along with provisional data widths associated with each bridge 320. These are shown as numbers (referring to numbers of bits which can be transmitted simultaneously by those bridges) within the square shape schematically representing the respective bridge 320.

The provisional data widths are provisionally assigned to the bridges based upon performance requirements of the related IP blocks 300 (not shown in FIG. 4). However, as discussed below, the provisional data widths can be amended or modified during the layout process of FIG. 3.

The circuit layout of FIG. 4 includes a number of data communication paths amongst all of the set of data handling nodes (in this example, bridges and routers) in the layout of FIG. 4. In particular, the bridges 320 can act as either source nodes or sink nodes for a given data communication path. The data communication paths have at least one router between the source node and the sink node. Note that, as between a pair of bridges, this analysis can indicate two data communication paths, one path being from a first of the bridges to the other of the bridges and the other path being in the opposite direction between the same pair of bridges.

The step 210 mentioned above concerns assigning a provisional data width to each routing node. This is done so that for each of the detected data communication paths, the one or more routing nodes or routers in that data communication path have a provisional data width sufficient to handle the data traffic requirements associated with that communication path. So, as part of this process, each router 330 of FIG. 4 is populated with a provisional data width. An example of the way in which this can be achieved will be discussed with reference to FIGS. 5 to 7.

Figure 5:
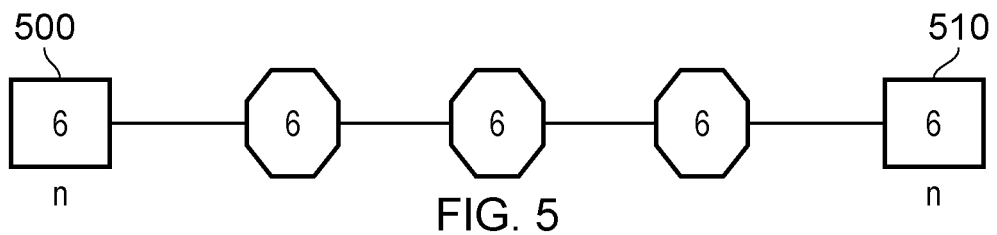
FIGS. 5 to 7 schematically illustrate example data communication paths.
Figure 6:
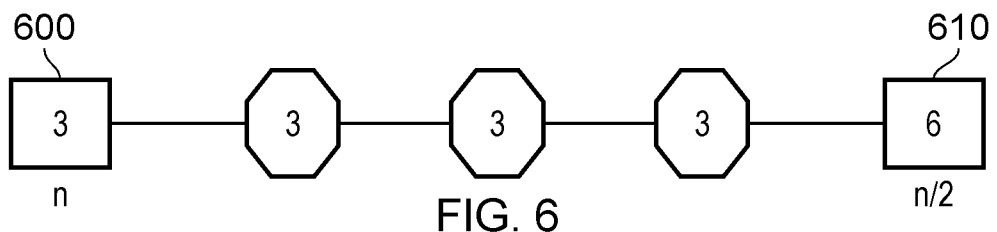
Figure 7:
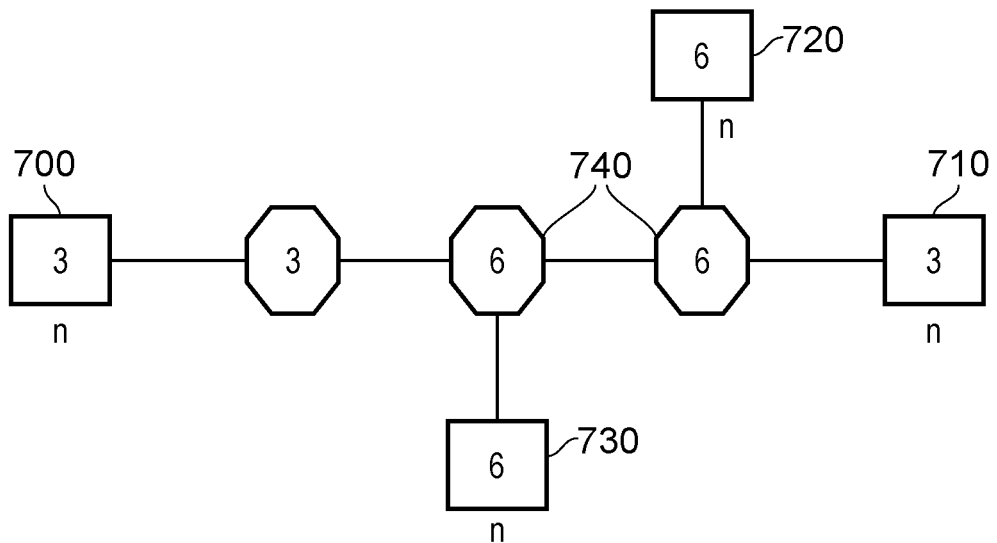

FIGS. 5 to 7 schematically represent example data communication paths involving bridge nodes (drawn as squares) and intervening routing nodes or routers drawn as octagons.

Referring to FIG. 5, for an example data communication path between a source node 500 and a sink node 510, the maximum possible bandwidth of each of the source and sink nodes is derived based on that node's provisional data width and clock frequency. In the example of FIG. 5, the source and sink nodes have a provisional data width of 6 and an equal clock frequency (of an arbitrary frequency "n").

A measure of effective bandwidth is derived as the minimum of the source and sink nodes' bandwidth. In FIG. 5, the bandwidth for each is 6n and so the minimum is also 6n.

Then, an effective data width is derived as the ceiling of the effective bandwidth divided by the clock frequency of the source node 500. Here, the ceiling function represents the integer next higher than a real number argument.

The provisional data width or "effective link size" is computed from "effective data width", header information and traffic. The "effective data width" is, in the present examples, the calibration of the actual data width of the source IP port. The "effective data width" is computed (in these examples) as a Minimum Of (Max bandwidth at source IP or node, Max bandwidth at destination (sink) IP or node) divided by the clock speed of the source IP or node. So the maximum effective rate by which traffic can be pushed from the source IP to the destination or sink IP is the "effective data width" multiplied by the clock speed of the source IP.

"effective link size" is computed for each traffic profile. Please note that there can be multiple traffic profiles between same pair of IPs. Hence each pair of IP gets a set of "effective link sizes". "effective link size" information is annotated to each router (as one of the candidate link size), on the route from source to destination IP. And this is done across all the routes. In the current example of FIG. 5, the provisional data width for each router is 6.

Another example is shown in FIG. 6, in which a source node 600 and a sink node 610 of an example communication path are linked again by three intermediate routers. The source node 600 has a provisional data width of 3 and a clock speed of n, whereas the sink node 610 has a provisional data width of 6 but a clock speed of n/2. The effective bandwidth is 3n and the effective data width is 3. Therefore, each router in the communication path is assigned the provisional data width of 3.

In FIG. 7, two intersecting communication paths are shown, one from a source node 700 to a sink node 710, both having a provisional data width of 3 and a clock speed of n, and another between a source node 720 and a sink node 730, both having a provisional data width of 6 and a clock speed of n. Applying the process described above to the communication path from the node 700 to the node 710 would give a provisional data width of 3 for each of the intervening routers. However, two of the routers 740 are also in the communication path from the node 720 to the node 730, which implies a provisional data width of 6. The larger of these two values, 6, is used as the provisional data width of these two routers.

Figure 8:
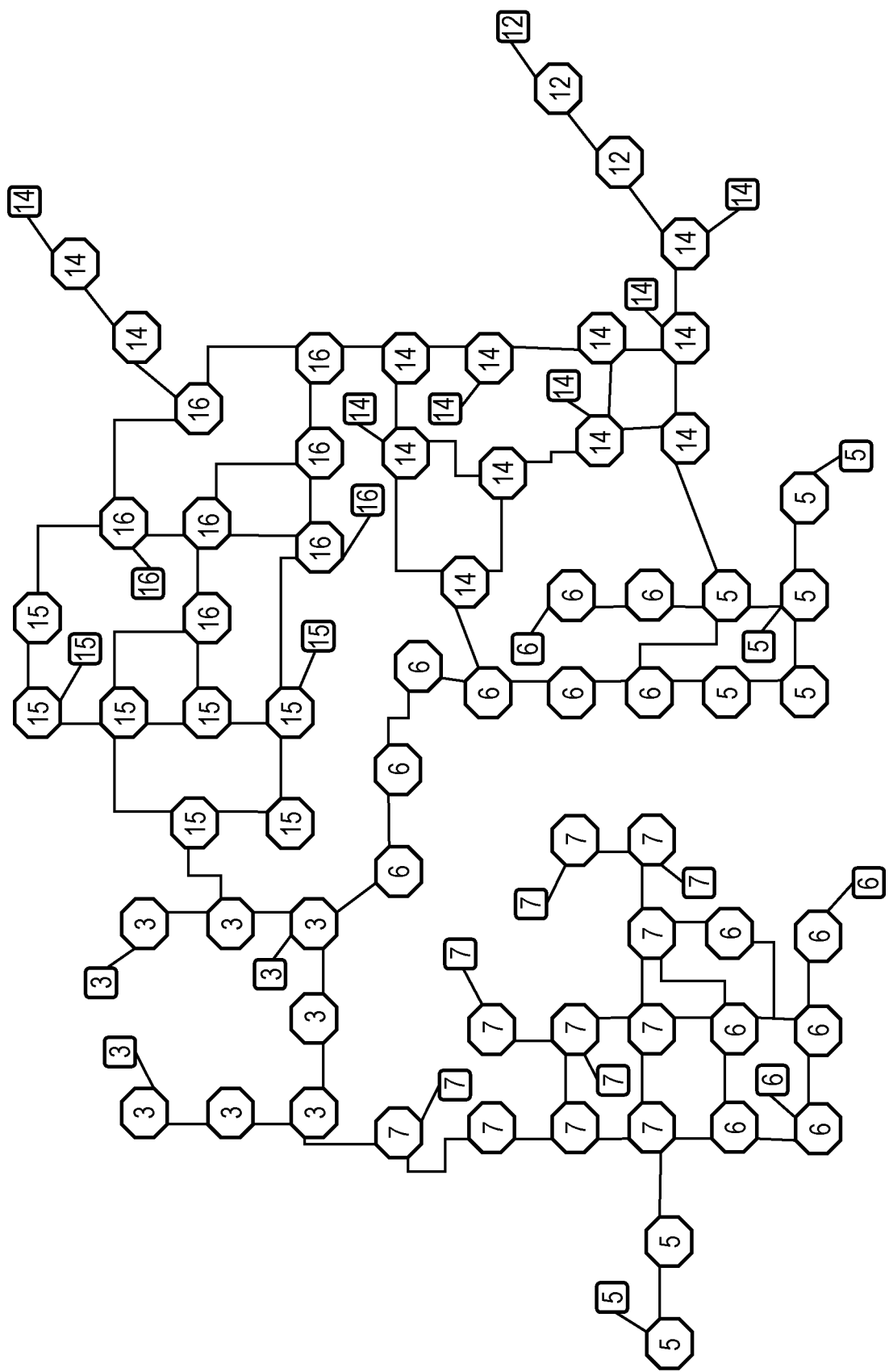
FIGS. 8 and 9 are schematic representations of the layout of FIG. 4.

In this way and using these techniques, a provisional data width is assigned to each router, drawn as an octagon, in the draft layout of FIG. 4, with the results being illustrated schematically in FIG. 8.

Figure 9:
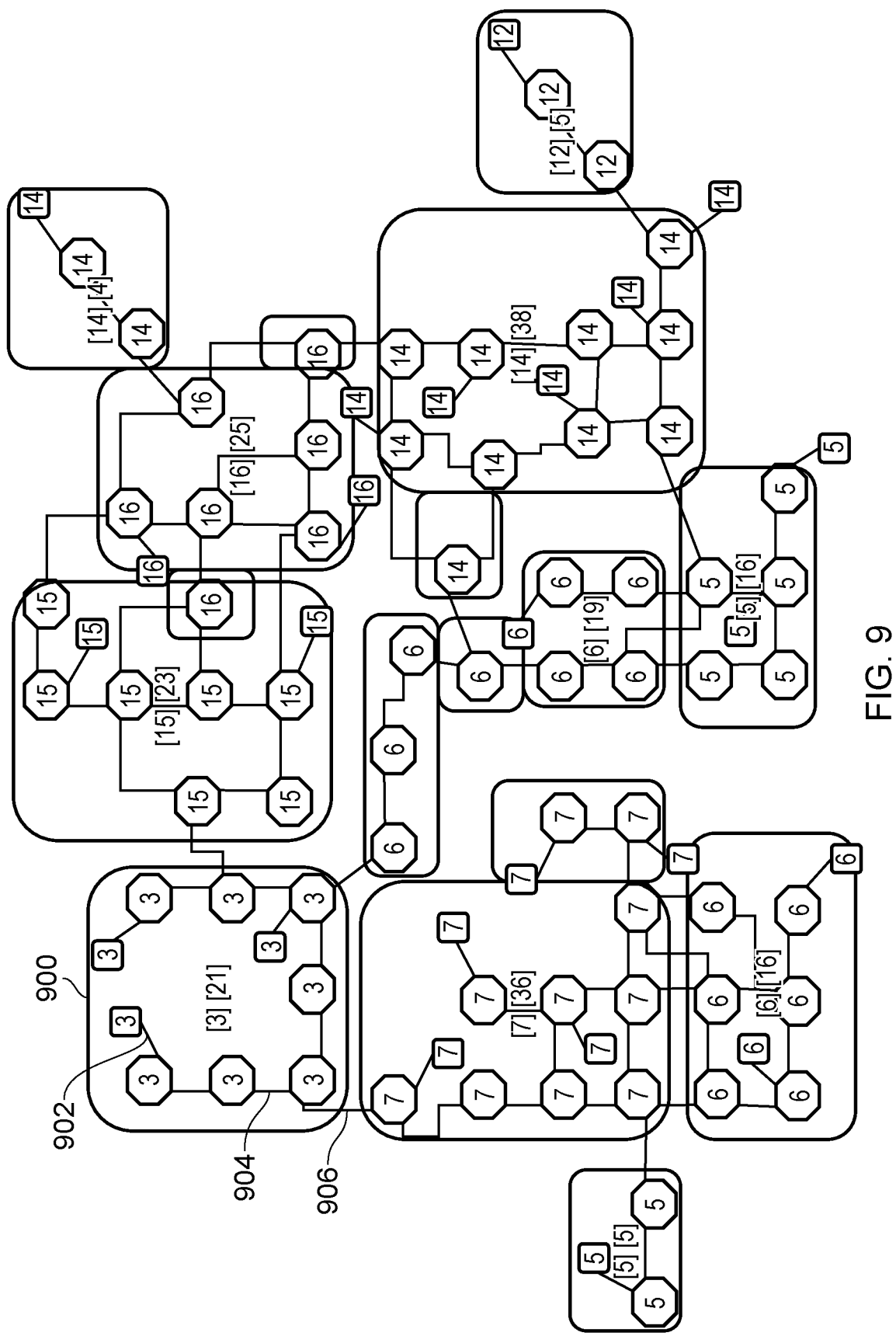

Referring to FIG. 9, a step of detecting two or more connected groups of the data handling nodes (source nodes, sink nodes and routing nodes) is performed, in which all of the data handling nodes in a given connected group have the same provisional data width and in which, for each given group, the provisional data width of data handling nodes in that group is different to the provisional data width of data handling nodes in a group connected to the given group.

In other words, the nodes shown in FIG. 8 are grouped according to provisional data width. A particular group for a given data width contains all of the connected nodes having that given provisional data width. So, for example, a group 900 contains nodes having a provisional data width of 3, a group 910 contains all of the connected nodes having a provisional data width of 14, and so on.

The grouping as applied in FIG. 9 can be referred to as a so-called undirected conflict graph.

As drawn in FIG. 9, there are two numerical values contained within square brackets inside each group as [W][L]. The first [W] is the provisional data width of nodes in that group, for example 3 in the case of the group 900. The second value [L] (for example, 21 in the case of the group 900) represents the number of connections or links within that group.

Within a group, the data handling nodes are connected to one another by data handling node links. A data connection between two nodes within the group is counted as two such links. An example is a data connection 902 or a data connection 904. A data connection to another group, such as a data connection 906 or a data connection 908 is counted as a single link in this arrangement. This arrives at a number of links equal to 21 for the group 900, and so on for the other groups shown in FIG. 9.

A process can then be performed with the aim of improving the layout of FIG. 9 with respect to a cost function. The technical significance of the cost function will be discussed with reference to FIGS. 10 and 11.

Figure 10:
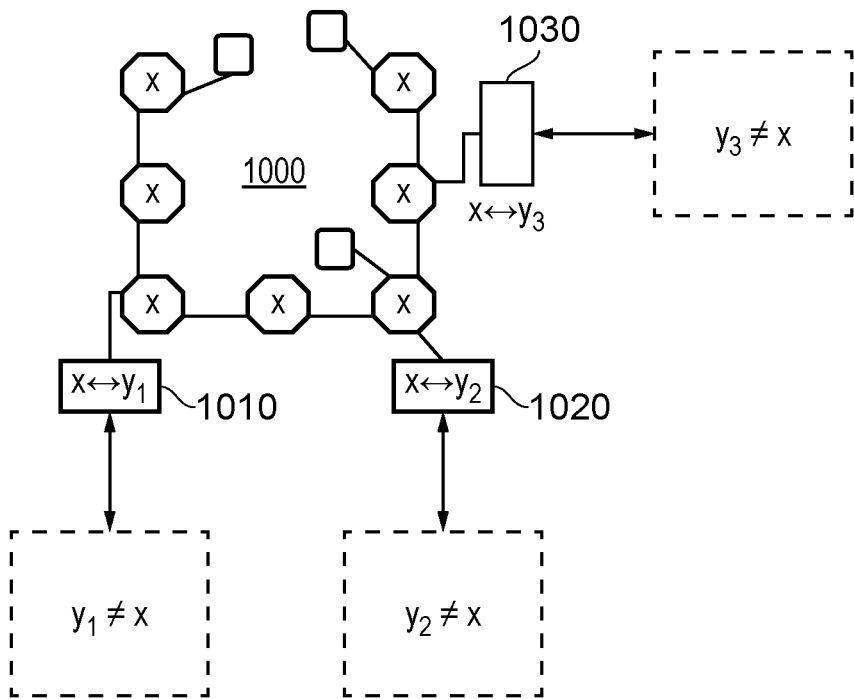
FIGS. 10 and 11 schematically illustrate the use of Resizer devices.
Figure 11:
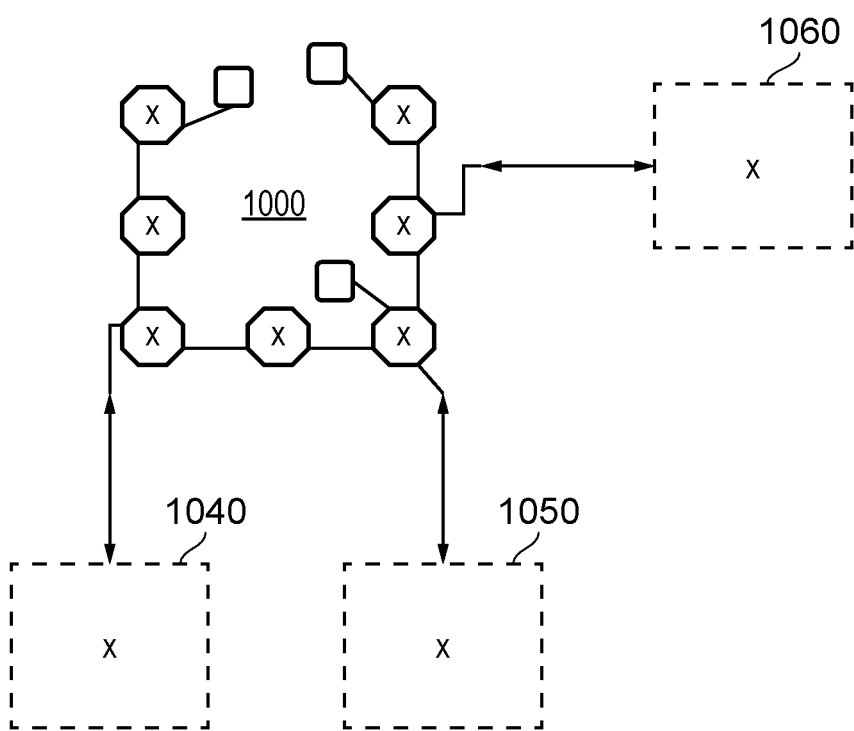

FIGS. 10 and 11 schematically represent the insertion into the layout of data width resizing components such as so-called "Serdes" (serializer-deserializer) or "resizer" components which convert between a first data width and a second data width, for example by breaking wider data words into multiple successive (serial) narrower data words.

In the example of FIG. 10, a group 100 (of the type shown in FIG. 9) is formed of nodes having an arbitrary data width x and is connected to other groups which are themselves shown schematically as broken line boxes having respective arbitrary data widths $y_1$, $y_2$, $y_3$, none of which is the same as x, although $y_1$, $y_2$ and $y_3$ could be the same or could be different to one another.

In order to convert between the data width x and each one of the data widths $y_n$, a Resizer component 1010, 1020, 1030 is required to be inserted into the layout between the respective groups. Including a Resizer component can increase the power consumption, layout size (on an integrated circuit substrate), and possibly the latency of the data connections.

On the other hand, in FIG. 11, the group 1000 still has an arbitrary data width x but the other 3 groups 1040, 1050, 1060 to which it is connected also have the data width x. in this situation, it is not in fact necessary to introduce Resizer components into the layout.

However, the process of changing (in the draft layout) the data width of at least one of the groups in order to achieve this matching of data widths will involve creating more conductors in the layout, so as to increase whichever is the smaller data width to match whichever is the larger data width. Here, it is noted that where two groups have respective different provisional data widths x, y, in order to match the data widths (and avoid the need for Resizer component) it is appropriate to increase the smaller data width to equal the larger. While the opposite could in theory be done (decreasing the larger to match the smaller), given that each provisional data width has been selected using the techniques of FIGS. 5 to 7 in order to handle the traffic requirements of a communication path, decreasing a provisional data width could (or in some cases definitely would) lead to an inability to handle those data traffic requirements. So in the present examples, in order to match data widths between connected groups, the smaller data width is increased to be equal to the larger data width, even if this provides excess data traffic handling capacity in some respects.

However, increasing the number of conductors and the data width in turn leads to potentially greater power consumption and potentially greater required layout area when the circuitry is implemented as an integrated circuit.

In the discussion below, changing a provisional data width of one group to match that of a connected group will be referred to as "merging" the groups, on the grounds that the definition of groups used earlier means that the two connected groups with the same data width would then be considered (under that definition) as a single group.

For this reason, there is a balance between including the Resizer (which themselves require layout area and power, and potentially increased latency) and changing the data widths so as to avoid the need for Resizer. This balance is handled by the cost function to be discussed in more detail below.

A pseudo-code example of a suitable cost function is as follows:

Cost Function ('U') [Example cost function]
Initialize 'cost' to 0
For each node 'n' in the initial graph 'U':
    'cost'+=the weight (size of 'n' in terms of port count) of the group 'n'*(link-size (or provisional data width) of the group 'n', or the first value [W] as drawn) (where the notation "+=" indicates that the function takes the current value of the variable and adds the second operand to it)

For each edge 'e' (boundary between two groups n1 and n2) in 'U':
 'cost'+=weight (number of times link-size mismatch occurs between 'n1' and 'n2') of 'e'
 *'Resizer_Cost' as a function of (link-size of 'n1', link-size of 'n2')
Return 'cost'
The Resizer_Cost relating to a required Resizer component between two groups of link_size_n1', 'link_size_n2') is arrived at as follows:
If ('link_size_n1'==1 and 'link_size_n2'==1) then return a value of 1
Otherwise:
Initialize constants 'A'=2.02658889; 'B'=2.2386217; 'C'=−5.52788207 'cost_in_links'='A'*'link_size_n1'+'B'*'link_size_n2'+'C'
Return 'cost_in_links'

This is just an example cost function, in which a respective weighting is applied to each parameter of the cost function, the weighting for a parameter being generated as a result of applying a weighting function to that parameter. In the example, the notional cost of the goes up with the number of data connections or links in a node or group, in a linear manner. The notional cost also goes up with a weighted sum of the two data widths. Alternatively, the cost could (for example) vary according to a polynomial or exponential function with respect to one or both data widths. Other parameters may contribute to the cost function. In general, the cost function may be configured to generate a cost value which indicates a greater cost in response to an increase in one or more parameters selected from the list consisting of:

power usage of data handling nodes and connections;
physical area required to fabricate the data handling nodes and data handling node links;
number of logic components required to fabricate the data handling nodes; and
latency of the data communication paths.

Figure 12:
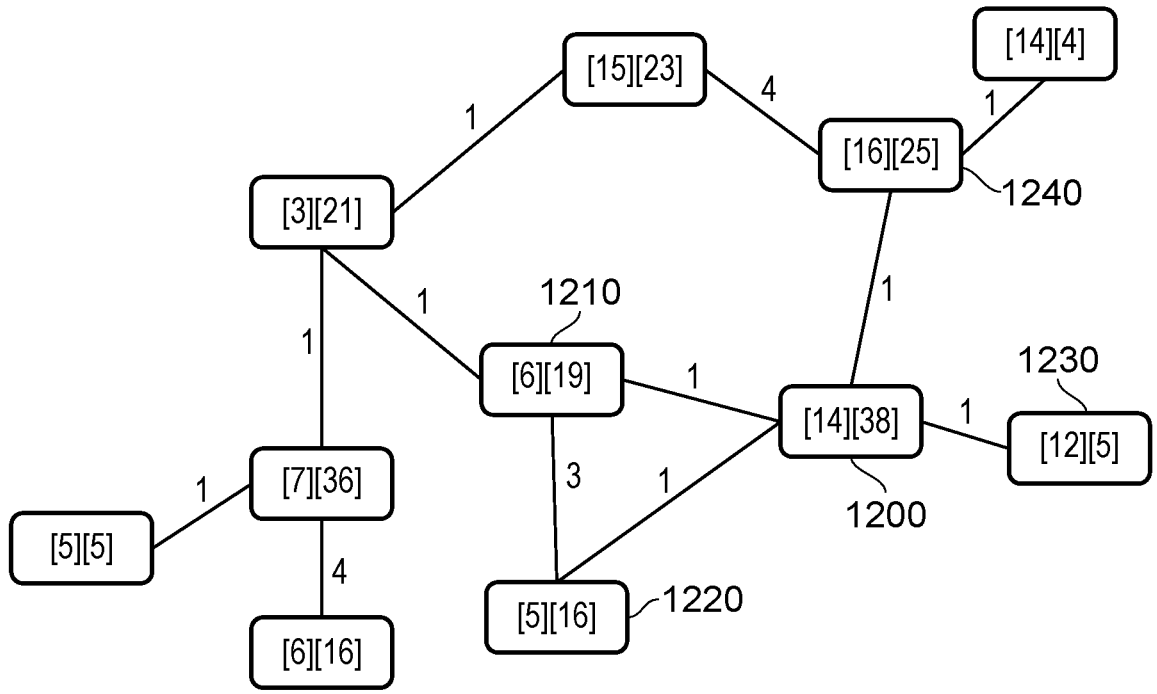
FIGS. 12 to 19 schematically illustrate the merging of connected groups of nodes.

Returning to the layout of FIG. 9, this is shown in a schematic form in FIG. 12, in that all of the individual nodes have been removed from the schematic drawing but the pairs of numbers (number of nodes and number of links) are retained, along with an indication (alongside lines joining the groups on the diagram) of the number of links between different groups.

The groups are ordered by an ordering criterion and then a group is selected from the ordered groups. Then, one or more merge candidate groups are selected from one or more other groups connected to the given selected group. Example arrangements perform two or more iterations of the method (or at least of the modifying step 220, and selecting at least two different given groups for different iterations according to the group ordering criterion.

In the example to be discussed, the ordering criterion is a function (such as the order) of the number of data handling node links within a group, which is to say the second number [L] shown in each box in FIG. 12, and the given group for a first iteration of the process is selected as the group with the most appropriate (for example, the largest) number of data handling node links, which is to say the largest second number as drawn in FIG. 12. In this example, the first selected given group is a group 1200.

Then, a merge candidate group is selected from those connected to the group 1200. In the present examples, the merge candidate group is one which has a lower provisional data width than the given group 1200, because the in an iteration of the modifying step the merging process will involve raising (or not changing, if a merge is not performed) the provisional data width of the potential merge candidate to match that of the given group 1200. So, potential merge candidate groups are groups 1210, 1220, 1230. The group 1240 is not a merge candidate group for the given group 1200.

Figure 13:
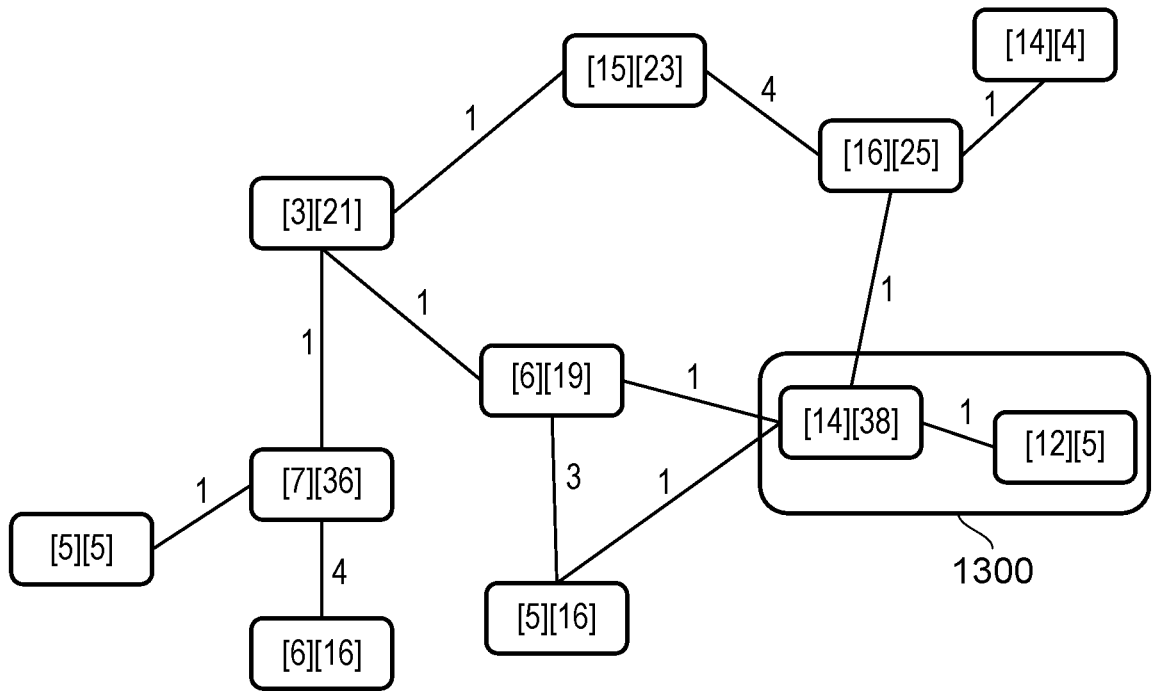

Amongst the merge candidate groups, a merge is selected according to which one of the merge candidate groups provides, when merged, the best net improvement in the cost function. In the example shown in FIG. 12 and further in FIG. 13, this is the group 1230, so that a merged group 1300 is generated based on the previous groups 1200, 1230.

Figure 14:
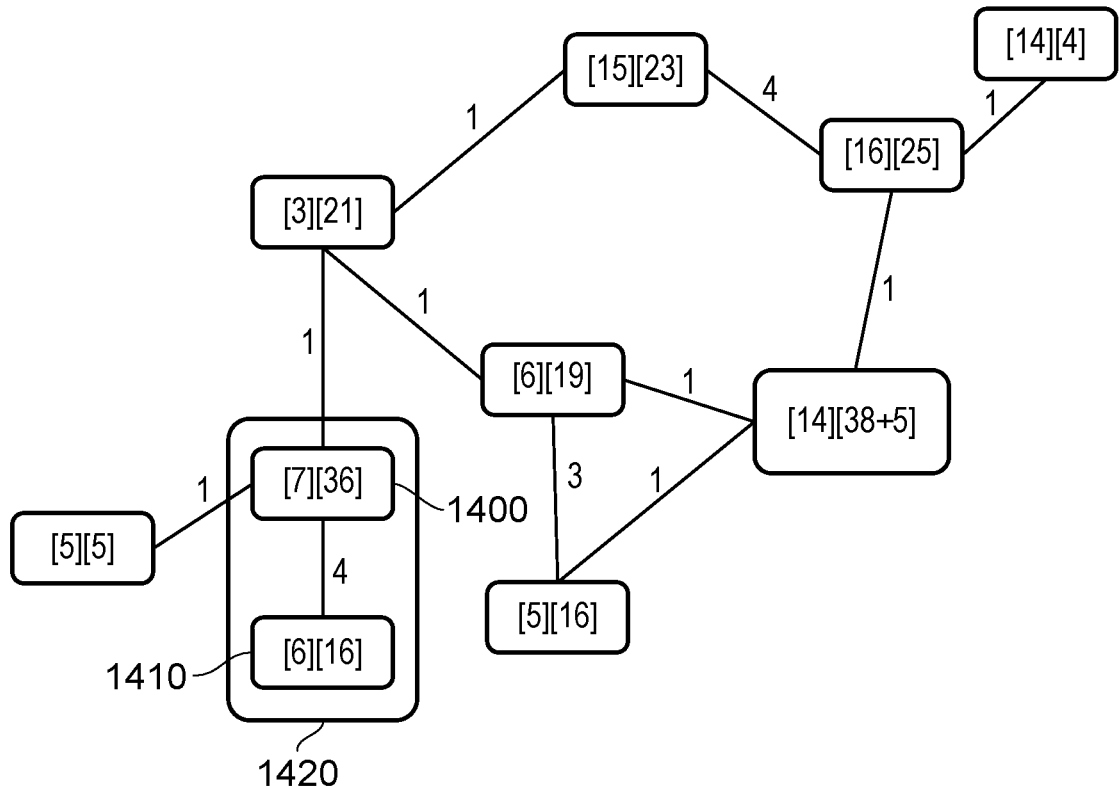
Figure 15:
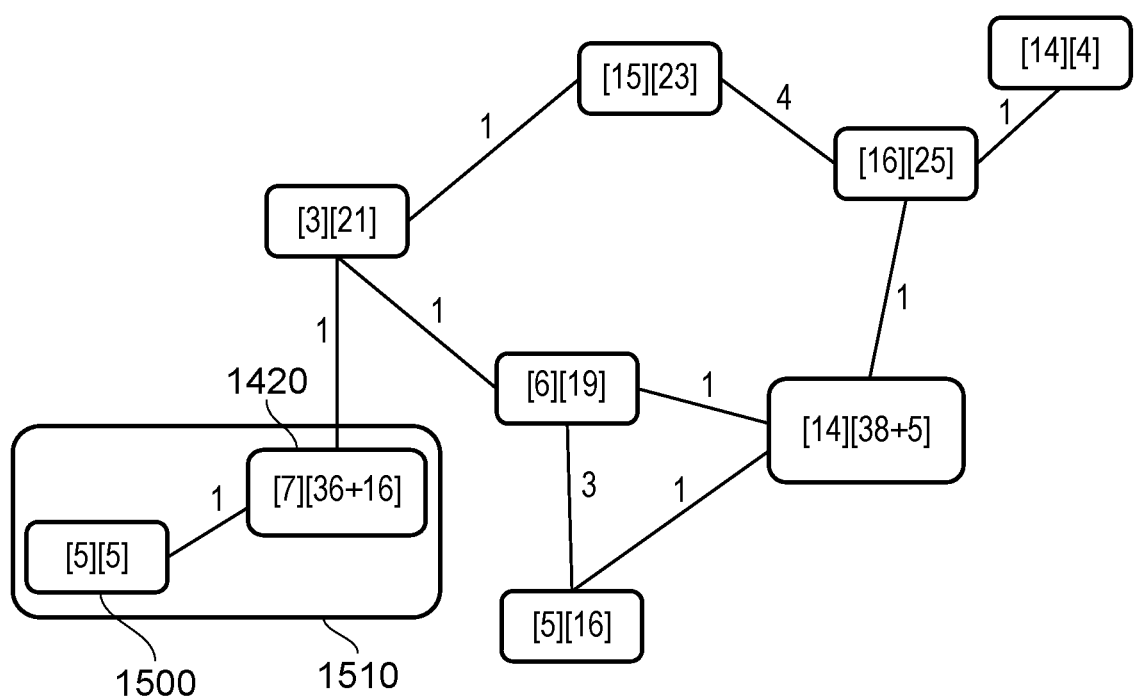

The process is repeated for a next higher group 1400, in terms of its second number, the number of links, as shown in FIG. 14 in which the group 1400 is merged with a group 1410 to provide a merged group 1420. In FIG. 15, the merged group 1420 is then merged with the group 1500 to provide a newly merged group 1510. Note that the merge process can continue to happen, across all the identified adjacent nodes, so it may occur more than once. the process can avoid an undesirable so-called hill climbing situation (where nodes just grow bigger and bigger without necessarily leading to the best overall outcome) by not adding merge candidates based on newly generated or newly identified neighbours. For example, node A is connected to B and node B is connected to C. Also assume that B is identified to be merged with A. After the merge, the new node AB is connected to C. In this same iteration C would not be considered as a candidate to be merged with AB. This avoids a situation in which eventually all the nodes are merged to one node (a typical hill climbing situation).

A pseudo-code representation of the process of the step 220, when implemented as an iterative loop, is as follows:
Do while ('merge_count'>0)
 'merge_count'=0
 For each node 'n' in the initial graph 'U', in descending order of weight, do the following:
  For each adjacent node 'c' of 'n', where candidate link-size of 'c' is less than the candidate link-size of 'n', do the following (to identify all merge candidates for this iteration; no new merge candidates are added here):
   Generate a candidate graph ('CU'), by merging node 'c' to node 'n'
   If Cost('CU')<Cost('U')
    'U'='CU' (adopt the candidate merger)
    ++'merge_count (increment merge count)

This pseudo-code summarises an arrangement in which successive iterations of the modifying step are performed, in which each iteration reduces the cost indicated by the cost value of the cost function, until no further iterations are possible which reduce the cost indicated by the cost value of the cost function.

Figure 16:
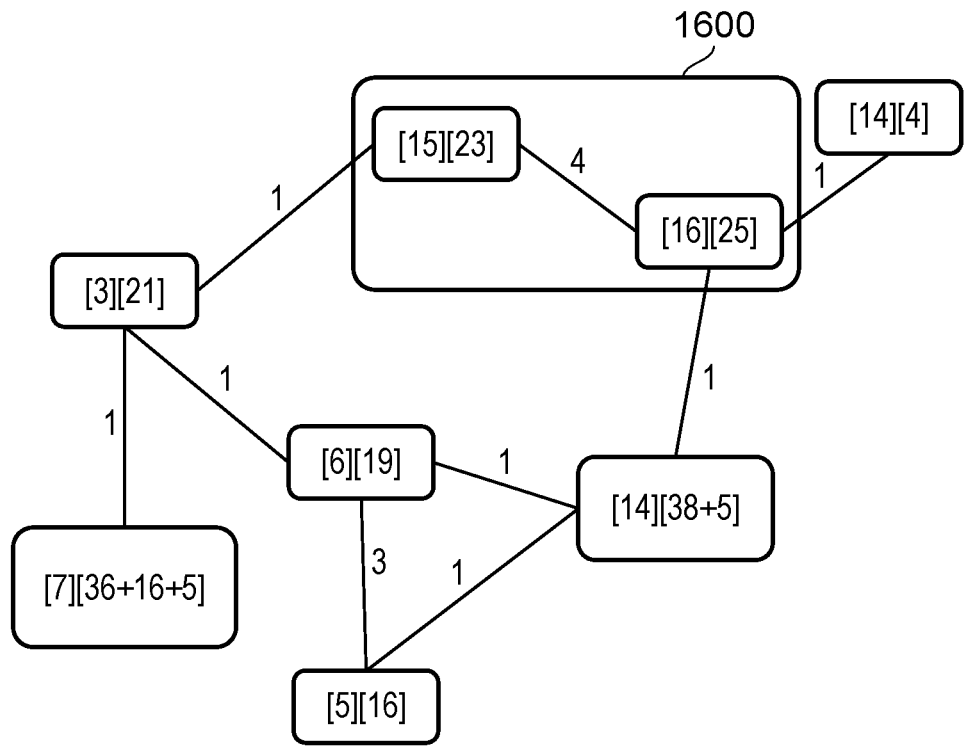
Figure 17:
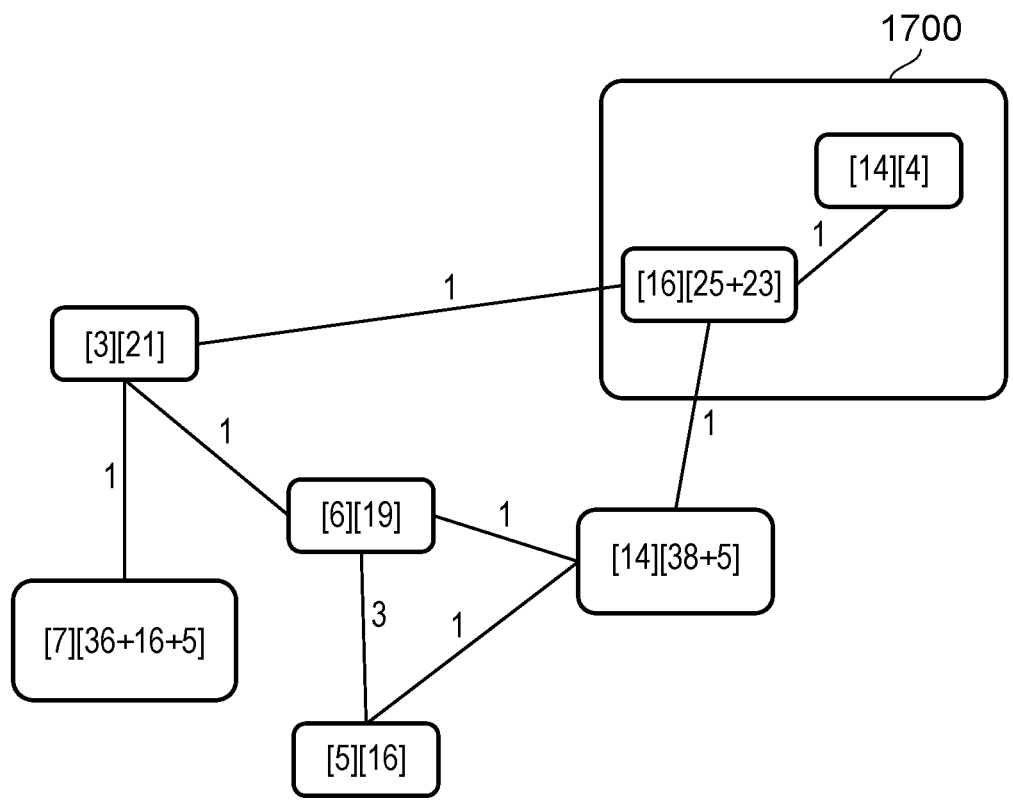
Figure 18:
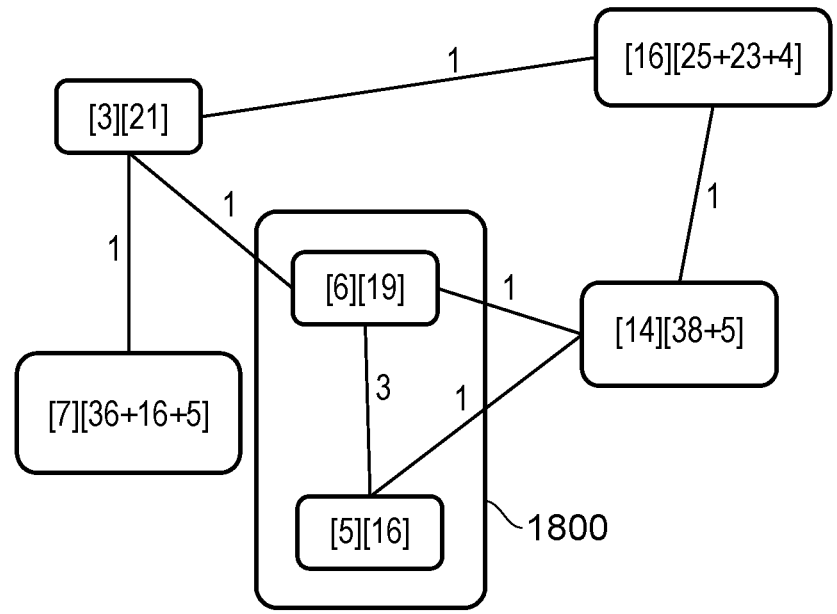

FIGS. 16, 17 and 18 show further instances of the generation of merged groups 1600, 1700 and 1800.

Figure 19:
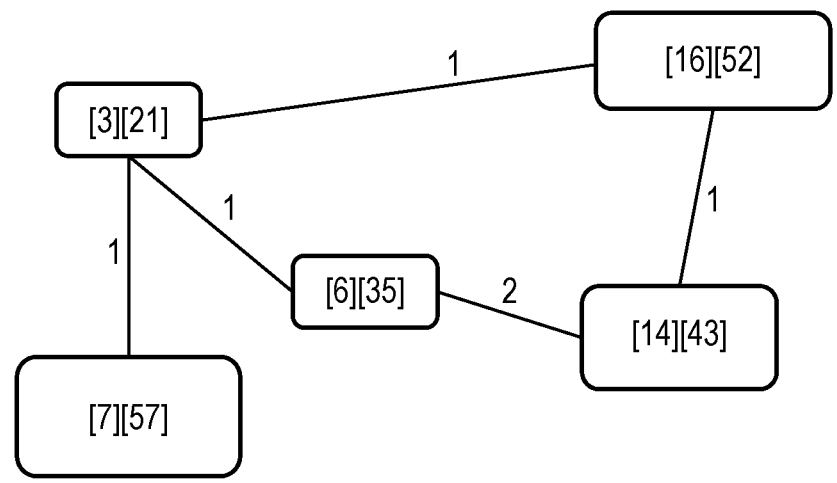

The process continues until, as shown in FIG. 19, a state is reached at which no further merges can be performed which give an improvement in the cost function. So, according to this particular cost function, FIG. 19 represents a best possible set of merged groups according to the cost function and process discussed above.

Figure 20:
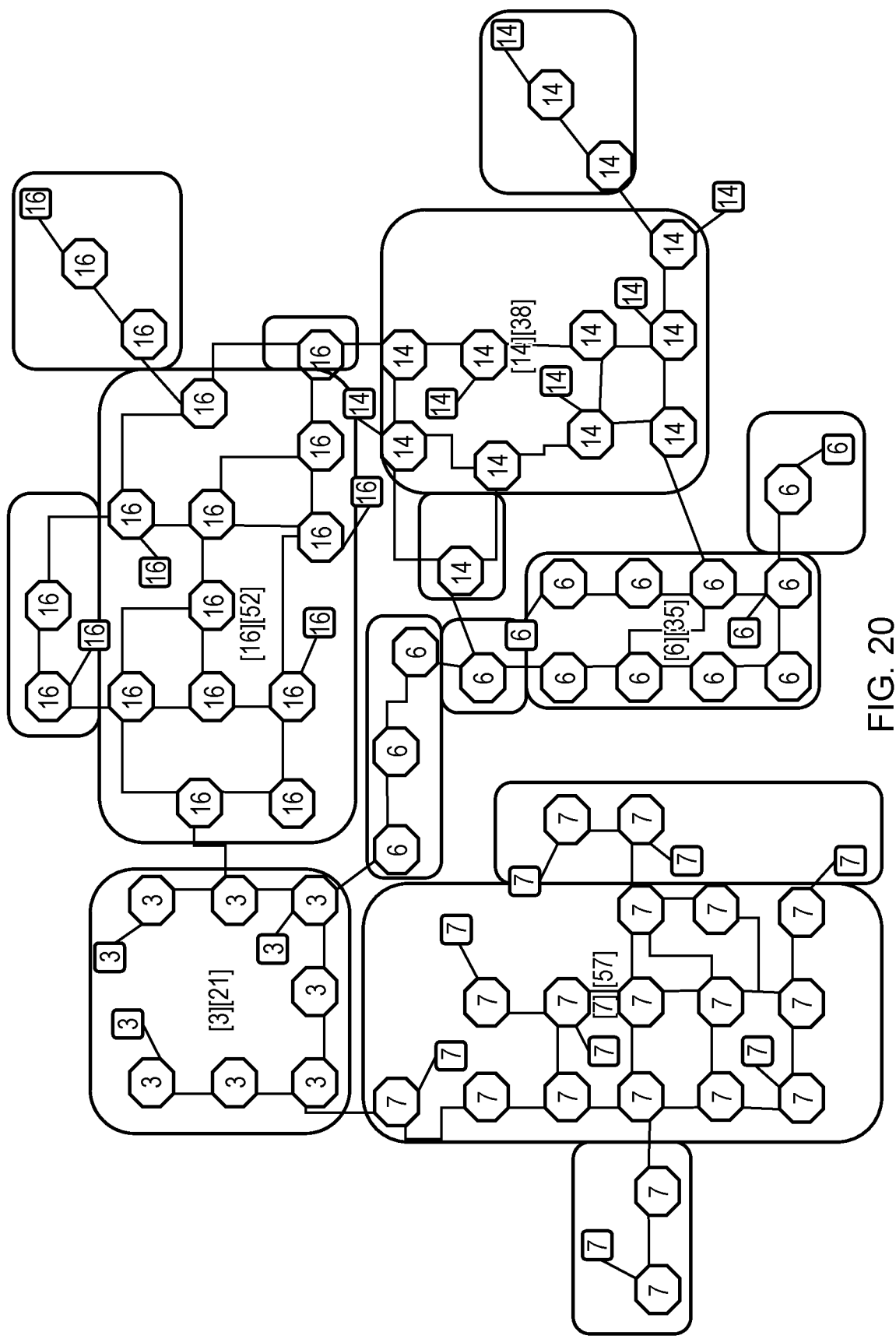
FIG. 20 schematically illustrates a resulting layout without Resizer components.
Figure 21:
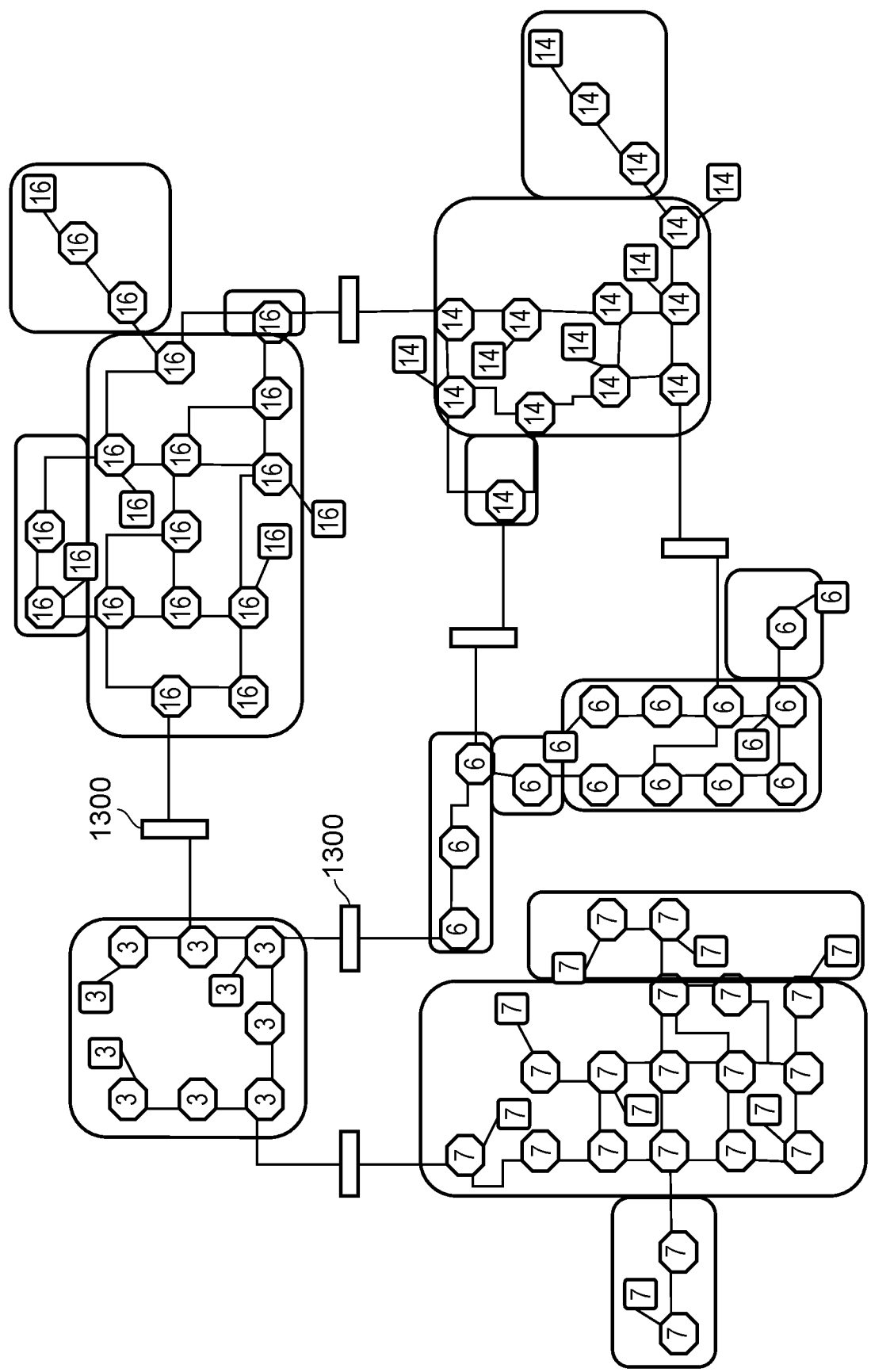
FIG. 21 schematically illustrates the layout of FIG. 20 with Resizer components inserted.
Figure 22:
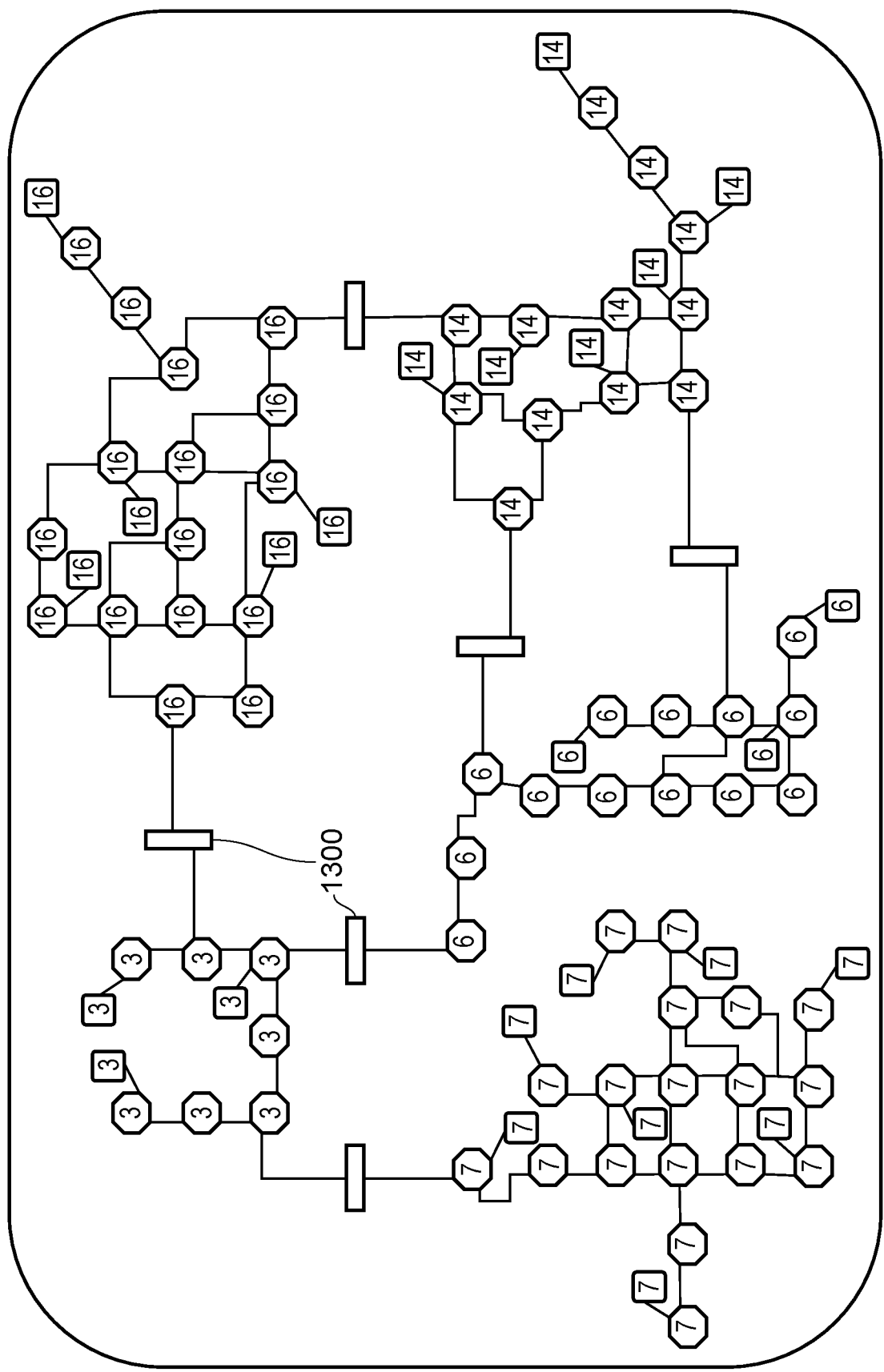
FIG. 22 schematically illustrates a final layout for fabrication.
Figure 23:
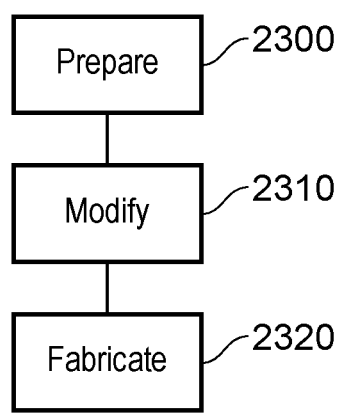
FIG. 23 is a schematic flowchart illustrating a method.

The arrangement of FIG. 19 is shown in expanded form in FIG. 20. As discussed above, each link between groups of a different data width is provided with a Resizer component 1300 as shown in FIG. 21, giving a final layout as shown in FIG. 22 in which a data width has been assigned to each node and Resizer components 1300 introduced where necessary. This layout can then be passed for physical layout on an integrated circuit substrate and implementation.

FIG. 22 is a schematic flowchart illustrating a method of integrated circuitry design and manufacture. At a step 1500, a draft circuitry layout is prepared. At a step 2310, the draft layout is modified according to the process described above and with reference to FIG. 3, to arrive at a modified layout. At a step 2320 an integrated circuit is fabricated according to the modified layout, using any known fabrication technique.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device (such as a processing element as discussed above) may be programmed to perform the function. "Configured to" does not imply that the apparatus element needs to be changed in any way in order to provide the defined operation.

Although illustrative embodiments of the present techniques have been described in detail herein with reference to the accompanying drawings, it is to be understood that the present techniques are not limited to those precise embodiments, and that various changes, additions and modifications can be effected therein by one skilled in the art without departing from the scope and spirit of the techniques as defined by the appended claims. For example, various combinations of the features of the dependent claims could be made with the features of the independent claims without departing from the scope of the present techniques.

The invention claimed is:

1. A computer-implemented method of integrated circuit design, the method comprising:
   using a computer, detecting data communication paths and associated data traffic requirements between a set of data handling nodes in an integrated circuit layout, the data handling nodes acting as routing nodes or either source nodes or sink nodes for a given data communication path, each source node and each sink node having a respective provisional data width, each data communication path having at least one routing node between the source node and the sink node;
   using the computer, assigning a provisional data width to each routing node so that, for each of the detected data communication paths, the one or more routing nodes in that data communication path have a provisional data width sufficient to handle the data traffic requirement associated with that communication path;
   using the computer, performing one or more iterations of modifying the integrated circuit topology by:
      (i) detecting two or more connected groups of the data handling nodes in which all of the data handling nodes in a given group have the same provisional data width and in which, for each given group, the provisional data width of data handling nodes in that group is different to the provisional data width of data handling nodes in a group connected to the given group;
      (ii) selecting two or more of the groups to be merged, in dependence upon a cost function; and
      (iii) merging the selected two or more groups, the merging comprising assigning a provisional data width to all of the data handling nodes in the selected two or more groups equal to one of the provisional data widths amongst the selected two or more groups; and
   using the computer, providing one or more other components in the layout including at least a data width resizing component between each pair of groups having different respective provisional data widths.

2. The method of claim 1 comprising:
   ordering the groups by an ordering criterion;
   selecting a given group from the ordered groups; and
   selecting one or more merge candidate groups from one or more other groups connected to the given group.

3. The method of claim 2 comprising performing two or more iterations of the modifying step, and selecting at least two different given groups for different iterations according to the group ordering criterion.

4. The method of claim 2, in which:
   the data handling nodes are connected to one another by data handling node links; and
   the ordering criterion is a function of the number of data handling node links connecting the data handling nodes in each group.

5. The method of claim 2, in which the one or more merge candidate groups have a lower provisional data width than the given group.

6. The method of claim 1, in which the provisional data width of any given data handling node is increased by, or unchanged as a result of, any given iteration of the modifying step.

7. The method of claim 1, in which the cost function is configured to generate a cost value which indicates a greater cost in response to an increase in one or more parameters selected from the list consisting of:
   power usage of data handling nodes and connections;
   physical area required to fabricate the data handling nodes and data handling node links;
   number of logic components required to fabricate the data handling nodes; and
   latency of the data communication paths.

8. The method of claim 7, comprising performing successive iterations of the modifying step, in which each iteration reduces the cost indicated by the cost value of the cost function, until no further iterations are possible which reduce the cost indicated by the cost value of the cost function.

9. The method of claim 7, comprising assigning a respective weighting to each parameter of the cost function, the weighting for a parameter being generated as a result of applying a weighting function to that parameter.

10. The method of claim 1, in which the data handling nodes are configured within more than one power domain.

11. The method of claim 10, in which one or more of the other components provided is a power converter component.

12. The method of claim 1, in which data handling nodes are configured within more than one clock domain.

13. The method of claim 12, in which one or more of the other components provided is a clock domain converter component.

14. The method of claim 1, in which, for a data communication path having, in the layout, at least a threshold path length, the routing nodes of that data communication path comprise a pipeline component.

15. The method of claim 1, in which the merging step comprises merging the selected two or more groups, the merging comprising assigning a provisional data width to all of the data handling nodes in the selected two or more groups equal to the highest provisional data width amongst the selected two or more groups.

16. The method of claim 4, in which the ordering criterion is an order of the number of data handling node links connecting the data handling nodes in each group.

17. The method of claim 16, comprising selecting the group with the largest number of data handling node links as the given group for the first iteration of the modifying step.

18. The method of claim 1, comprising the step of:
fabricating an integrated circuit layout according to the integrated circuit design.

19. An integrated circuit having an integrated circuit design produced by the following computer-implemented method:
using a computer, detecting data communication paths and associated data traffic requirements between a set of data handling nodes in an integrated circuit layout, the data handling nodes acting as routing nodes or either source nodes or sink nodes for a given data communication path, each source node and each sink node having a respective provisional data width, each data communication path having at least one routing node between the source node and the sink node;
using the computer, assigning a provisional data width to each routing node so that, for each of the detected data communication paths, the one or more routing nodes in that data communication path have a provisional data width sufficient to handle the data traffic requirement associated with that communication path;
using the computer, performing one or more iterations of modifying the integrated circuit topology by:
(i) detecting two or more connected groups of the data handling nodes in which all of the data handling nodes in a given group have the same provisional data width and in which, for each given group, the provisional data width of data handling nodes in that group is different to the provisional data width of data handling nodes in a group connected to the given group;
(ii) selecting two or more of the groups to be merged, in dependence upon a cost function; and
(iii) merging the selected two or more groups, the merging comprising assigning a provisional data width to all of the data handling nodes in the selected two or more groups equal to one of the provisional data widths amongst the selected two or more groups; and
using the computer, providing one or more other components in the layout including at least a data width resizing component between each pair of groups having different respective provisional data widths.

20. A computer program product comprising a non-transitory machine-readable storage medium on which are stored program instructions which, when executed by a computer processor, cause the computer processor to perform a method of integrated circuit design, the method comprising:
detecting data communication paths and associated data traffic requirements between a set of data handling nodes in an integrated circuit layout, the data handling nodes acting as routing nodes or either source nodes or sink nodes for a given data communication path, each source node and each sink node having a respective provisional data width, each data communication path having at least one routing node between the source node and the sink node;
assigning a provisional data width to each routing node so that, for each of the detected data communication paths, the one or more routing nodes in that data communication path have a provisional data width sufficient to handle the data traffic requirement associated with that communication path;
performing one or more iterations of modifying the integrated circuit topology by:
(i) detecting two or more connected groups of the data handling nodes in which all of the data handling nodes in a given group have the same provisional data width and in which, for each given group, the provisional data width of data handling nodes in that group is different to the provisional data width of data handling nodes in a group connected to the given group;
(ii) selecting two or more of the groups to be merged, in dependence upon a cost function; and
(iii) merging the selected two or more groups, the merging comprising assigning a provisional data width to all of the data handling nodes in the selected two or more groups equal to one of the provisional data widths amongst the selected two or more groups; and
providing one or more other components in the layout including at least a data width resizing component between each pair of groups having different respective provisional data widths.

* * * * *